(12) United States Patent
Utsunomiya et al.

(10) Patent No.: US 9,923,411 B2
(45) Date of Patent: Mar. 20, 2018

(54) ELECTRONIC DEVICE

(71) Applicants: SII Semiconductor Corporation, Chiba-shi, Chiba (JP); The Ritsumeikan Trust, Kyoto-shi, Kyoto (JP)

(72) Inventors: Fumiyasu Utsunomiya, Chiba (JP); Takakuni Douseki, Kusatsu (JP); Ami Tanaka, Kusatsu (JP)

(73) Assignees: SII SEMICONDUCTOR CORPORATION, Chiba (JP); THE RITSUMEIKAN TRUST, Kyoto (JP)

( * ) Notice: Subject to any disclaimer, the term of this patent is extended or adjusted under 35 U.S.C. 154(b) by 65 days.

(21) Appl. No.: 15/194,693

(22) Filed: Jun. 28, 2016

(65) Prior Publication Data
US 2017/0005508 A1    Jan. 5, 2017

(30) Foreign Application Priority Data
Jun. 30, 2015 (JP) ................. 2015-131469

(51) Int. Cl.
| H01M 10/44 | (2006.01) |
| H01J 40/00 | (2006.01) |
| H02J 7/35 | (2006.01) |
| H02J 7/00 | (2006.01) |
| G06F 3/0354 | (2013.01) |
| G06F 3/038 | (2013.01) |

(52) U.S. Cl.
CPC ............ *H02J 7/355* (2013.01); *G06F 3/0383* (2013.01); *G06F 3/03543* (2013.01); *H02J 7/0072* (2013.01)

(58) Field of Classification Search
CPC ...... H02J 7/355; H02J 7/0072; G06F 3/03543
USPC .......................................... 320/101; 250/200
See application file for complete search history.

(56) References Cited

U.S. PATENT DOCUMENTS

| RE35,043 | E  * | 9/1995 | Takeda .................. G04C 10/02 320/101 |
| 6,301,198 | B1 * | 10/2001 | Otaka .................... G04C 10/02 320/101 |
| 6,646,960 | B1 * | 11/2003 | Nagata .................. G04C 10/00 320/101 |
| 7,880,126 | B2 * | 2/2011 | Yonemaru ................ G01J 1/46 250/208.1 |

(Continued)

FOREIGN PATENT DOCUMENTS

JP            5616649 B2    10/2014

*Primary Examiner* — M'Baye Diao
(74) *Attorney, Agent, or Firm* — Brinks Gilson & Lione

(57) ABSTRACT

An electronic device includes: a light detection circuit having a first light sensor and a second light sensor each generating a photocurrent by photoelectric conversion, a resistive element which allows a difference between the photocurrents generated by the first light sensor and the second light sensor to flow, and a voltage detection circuit which detects a voltage generated by the flow of the differential photocurrent through the resistive element, said electronic device being controlled in operation by an output signal of the light detection circuit; a storing unit charged each time the electronic device is operated; and a rectifying element provided between the storing unit and the resistive element. A current with which the storing unit is charged is made to flow to the resistive element through the rectifying element.

3 Claims, 2 Drawing Sheets

(56) References Cited

U.S. PATENT DOCUMENTS

| | | | |
|---|---|---|---|
| 8,106,346 B2 * | 1/2012 | Hirose | H03K 17/785 250/208.1 |
| 8,259,061 B2 * | 9/2012 | Omi | G01J 1/02 345/102 |
| 9,236,747 B2 * | 1/2016 | Utsunomiya | H02J 7/0068 |

* cited by examiner

ELECTRONIC DEVICE

RELATED APPLICATIONS

This application claims priority under 35 U.S.C. § 119 to Japanese Patent Application No. 2015-131469 filed on Jun. 30, 2015, the entire content of which is hereby incorporated by reference.

BACKGROUND OF THE INVENTION

Field of the Invention

The present invention relates to an electronic device which detects ambient light by a light detection circuit and is controlled in operation in a detected state thereof Background Art FIGS. 2A and 2B are external diagrams of a related art electronic device, one example of which is a mouse device 201 having a light detection circuit. FIG. 2A is an external diagram as seen from above of the mouse device 201, and FIG. 2B is an external diagram as seen from the back of the mouse device 201. As illustrated in FIG. 2A, the related art mouse device 201 includes a first button 202 and a second button 203, a wheel 204, and a first light sensor 103 and a second light sensor 102. Further, as illustrated in FIG. 2B, the back surface of the related art mouse device 201 includes a moving sensor 206 which reads a moving quantity of the mouse device 201, and a power supply switch 205 which forcibly turns ON a power supply of the mouse device 201.

The first light sensor 103 has been arranged at a portion hidden by the hand when the mouse device 201 is manually manipulated by a user. The second light sensor 102 has been arranged at a portion not hidden by the hand when the mouse device 201 is manually manipulated by the user.

When the quantity of light incident to the first light sensor 103 is small, and the quantity of light incident to the second light sensor 102 is large, a light detection circuit (not shown) makes the mouse device 201 normally operate. Further, when the quantity of the light incident to the first light sensor 103 is large, and the quantity of the light incident to the second light sensor 102 is also large, the light detection circuit makes the mouse device 201 stop its functions, or makes the mouse device 201 operate in a low power consumption mode such as a standby mode. Alternatively, the light detection circuit makes the mouse device 201 stop a power supply to each means in the mouse device 201. Furthermore, even when the quantity of the light incident to the second light sensor 102 is small, the light detection circuit makes the mouse device 201 stop its functions, or makes the mouse device 201 operate in the low power consumption mode such as the standby mode. Alternatively, the light detection circuit makes the mouse device 201 stop a power supply to each means in the mouse device 201.

With the above-described configuration, the mouse device 201 is normally operated only when the environment is bright and the mouse device 201 is manually manipulated, i.e., when the quantity of the light incident to the first light sensor 103 is small, and the quantity of the light incident to the second light sensor 102 is large. On the other hand, when the hand is moved away from the mouse device 201, it is possible for the related art light detection circuit to make the mouse device 201 immediately stop, make the mouse device 201 operate in the low power consumption mode such as the standby mode, or make the mouse device 201 stop the power supply to each means in the mouse device 201 (refer to, for example, Patent Document 1).

[Patent Document 1] Japanese Patent No. 5616649

SUMMARY OF THE INVENTION

As described above, the mouse device illustrated as the one example of the related art electronic device having the light detection circuit is accompanied by a problem that since the light detection circuit is not capable of detecting the difference between the quantities of incident light when the environment is dark, the mouse device cannot be started up.

In order to solve the above-described problems and achieve the object, the present invention has adopted the following aspects.

The electronic device according to one aspect of the present invention includes a light detection circuit having first and second light sensors each generating a photocurrent by photoelectric conversion, a resistive element which allows a difference between the photocurrents generated by the first and second light sensors to flow, and a voltage detection circuit detecting a voltage generated by the flow of the differential photocurrent through the resistive element, and is controlled in operation by an output signal of the light detection circuit. The electronic device includes storing unit charged each time the electronic device is operated, and rectifying element provided between the storing unit and the resistive element. In the electronic device, a current with which the storing unit is charged is made to flow to the resistive element through the rectifying element.

According to the electronic device of the above-described aspect of the present invention, the electronic device starts to control when operated by a user. When the electronic device is re-operated by the user within a preset period, its control can be maintained. Further, since the number of components to be added for adding this control function is small, the electronic device is small in size and low in cost. Furthermore, since the components to be added are few, it is possible to minimize an increase in power consumption by the additional components.

DETAILED DESCRIPTION OF THE PREFERRED EMBODIMENTS

Figure 2A:
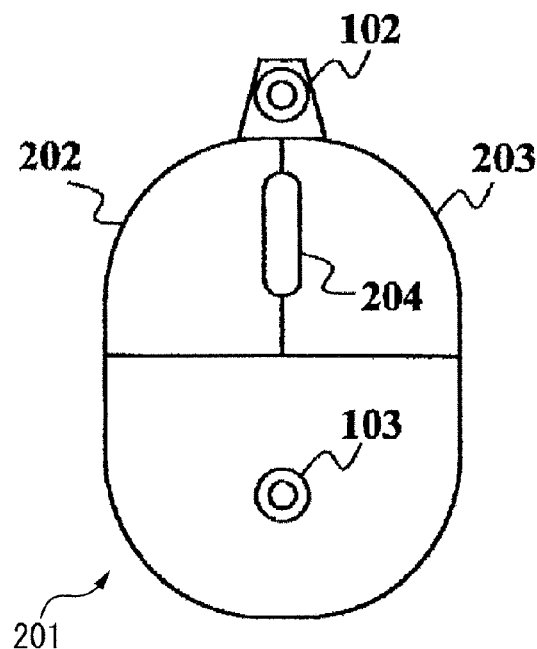
FIG. 2A is an external diagram as seen from above of a related art mouse device having a light detection circuit.
Figure 2B:
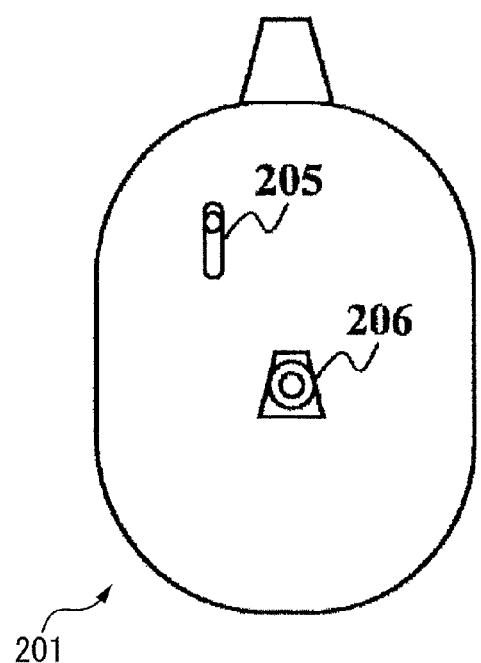
FIG. 2B is an external diagram as seen from back of the related art mouse device having the light detection circuit.

One embodiment of the present invention will hereinafter be described with reference to the accompanying drawings. In addition, in the following explanations, the differences between a mouse device according to the present embodiment and the related art mouse device 201 explained by using FIGS. 2A and 2B are mainly explained, and the same reference signs are attached to the same structural elements, and the explanations thereof are omitted.

Figure 1:
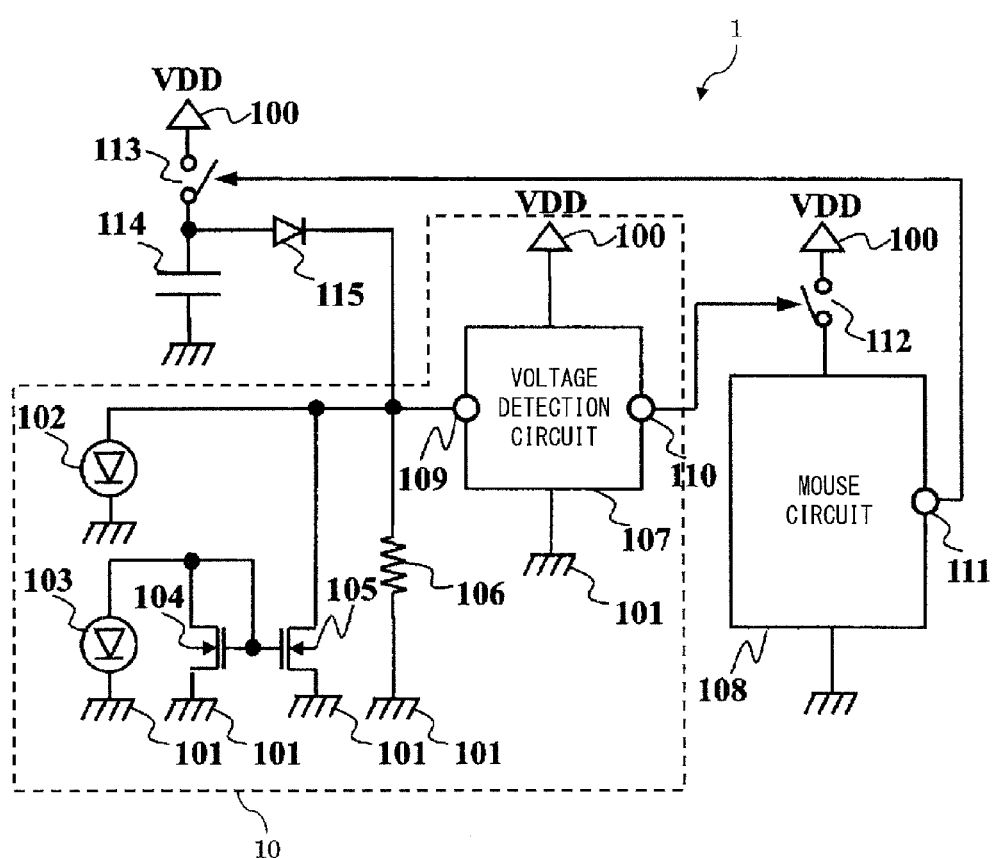
FIG. 1 is a schematic circuit diagram of a mouse device 1 having a light detection circuit according to one embodiment of the present invention.

FIG. 1 is a schematic circuit diagram of an electronic device, one example of which is a mouse device 1 having a light detection circuit 10 according to the present embodiment. The mouse device 1 according to the present embodiment includes a light detection circuit 10; a diode 115; a capacitor 114; a switch 113; a switch 112; and a mouse circuit 108. The light detection circuit 10 includes a light sensor 102; a light sensor 103; an NMOS transistor 104; an NMOS transistor 105; a resistive element 106; and a voltage detection circuit 107.

The operation of the mouse device 1 is controlled by an output signal of the light detection circuit 10.

The light sensor 102 (one example of a first light sensor) has an N type terminal connected to a GND terminal 101, and a P type terminal connected to a drain of the NMOS transistor 105, an input terminal 109 of the voltage detection circuit 107, and an N type terminal of the diode 115. Further, the P type terminal of the light sensor 102 is connected to the GND terminal 101 through the resistive element 106. The light sensor 103 (one example of a second light sensor) has an N type terminal connected to the GND terminal 101, and a P type terminal connected to a drain and a gate of the NMOS transistor 104, and a gate of the NMOS transistor 105. The NMOS transistor 104 has a source connected to the GND terminal 101.

The light sensor 102 and the light sensor 103 generate photocurrent by photoelectric conversion. The light sensor 102 and the light sensor 103 have PN junction structure which generates power with light, and outputs photocurrent generated by the power generation. In addition, the resistive element 106 makes the difference of the photocurrents generated by the light sensor 102 and the light sensor 103 flow.

The NMOS transistor 104 and the NMOS transistor 105 constitute a current mirror circuit. The voltage detection circuit 107 is connected with a VDD terminal 100 and the GND terminal 101 as for a power supply and has an output terminal 110 connected to a control terminal which controls ON/OFF of the switch 112. In addition, the voltage detection circuit 107 detects a voltage generated by the flow of the photocurrent through the resistive element 106.

The diode 115 (one example of a rectifying element) has a P type terminal connected to the GND terminal 101 through the capacitor 114 and connected to the VDD terminal 100 through the switch 113. That is, the diode 115 is provided between the capacitor 114 and the resistive element 106.

The mouse circuit 108 is connected with the VDD terminal 100 via the switch 112, and the GND terminal 101 as for the power supply, and has an output terminal 111 connected to the control terminal which controls ON/OFF of the switch 113. When the mouse device 1 is manipulated, the mouse circuit 108 outputs, from the output terminal 111, a signal for turning ON the switch 113 for a moment. In addition, even in a state in which a power supply is not supplied, the mouse circuit 108 may generate a signal to send the signal for turning ON the switch 113 for a moment. For example, this signal may be generated by a power supplied from the VDD terminal 100 when the first button 202, the second button 203, or the wheel 204 is manipulated. In addition, this signal may be generated by an electromotive force using a piezoelectric element or an electromagnetic induction by a coil and a magnet.

The operation of the mouse device 1 according to the present embodiment will next be described.

When light enters the light sensor 103, a photocurrent is outputted from the light sensor 103. The photocurrent is mirrored to the NMOS transistor 105 through the NMOS transistor 104 of the current mirror circuit. The NMOS transistor 105 has, for example, twice the drive capability of the NMOS transistor 104. A current equivalent to twice the photocurrent which flows from the light sensor 103 to the NMOS transistor 104 flows through the NMOS transistor 105. On the other hand, a photocurrent generated due to the incidence of light to the light sensor 102 flows through the NMOS transistor 105 and the resistive element 106. Therefore, when the light sensor 102 and the light sensor 103 are made incident with light of the same intensity, most of the photocurrent generated in the light sensor 102 flows to the NMOS transistor 105 and hardly flows to the resistive element 106. Thus, no voltage is generated in the resistive element 106.

Here, when the mouse device 1 is manually manipulated by the user in a state in which the environment is bright, only the light sensor 103 is shielded with the operating hand. Therefore, the photocurrent is generated in the light sensor 102, but no photocurrent is generated in the light sensor 103. Since no current flows through the NMOS transistor 105 when the photocurrent does not occur in the light sensor 103, the photocurrent generated in the light sensor 102 flows wholly into the resistive element 106. Accordingly, a voltage is generated in the resistive element 106. When the voltage generated in the resistive element 106 is inputted to the input terminal 109, the voltage detection circuit 107 outputs an output signal for turning ON the switch 112 from the output terminal 110. Since the power supply is supplied when the switch 112 is turned ON, the mouse circuit 108 starts operation. Thus, only when the mouse device 1 is manually manipulated where the environment is bright, the mouse circuit 108 is operated. In other cases, the mouse circuit 108 stops operating.

Next, since no photocurrent is generated in the light sensor 102 where the environment is dark, no current flows into the resistive element 106. Therefore, since no voltage is generated in the resistive element 106, the operation of the mouse circuit 108 is at a stop. When the mouse device 1 is manipulated by the user at this time, a signal for turning ON the switch 113 for a moment is outputted from the output terminal 111 of the mouse circuit 108. When the switch 113 is turned ON, the capacitor 114 (one example of a storing unit) is charged to the voltage at the VDD terminal. That is, the capacitor 114 is charged each time the mouse device 1 is manipulated. When the capacitor 114 is charged, a current flows from the capacitor 114 to the resistive element 106 via the diode 115. That is, the current charged in the capacitor 114 is flowed to the resistive element 106 through the diode 115. Accordingly, a voltage is generated in the resistive element 106, so that the mouse circuit 108 starts operation. When the mouse device 1 is manipulated until the capacitor 114 is completely discharged, the capacitor 114 is recharged and hence the mouse circuit 108 continues operating. When the operation of the mouse device 1 is not performed for a while, the capacitor 114 is completely discharged, so that no voltage is generated in the resistive element 106. Therefore, since the voltage detection circuit 107 turns OFF the switch 112, the mouse circuit 108 is stopped.

Incidentally, the diode 115 is provided to prevent the speed of rising of the voltage of the resistive element 106 with changes in the photocurrents of the light sensor 102 and the light sensor 103 from becoming slow with the capacitor 114. With the provision of the diode 115, the voltage is immediately generated in the resistive element 106 when the mouse device 1 is held in hand in a case of the situation where the environment is bright. It is therefore possible for the mouse circuit 108 to start operation immediately. Further, the resistive element 106 for detecting the current of the light sensor 102 or 103 is very large in resistance and large in occupation area. Utilizing the resistive element 106 also as a resistive element for detecting a discharge current of the capacitor 114 makes it possible to eliminate an increase in the occupation area of the resistive element, thereby resulting in providing the mouse device 1 of the present embodiment, which is small in size and low in cost.

Further, since it is also unnecessary to separately provide the voltage detection circuit 107 for detecting the voltage of the resistive element 106, it is possible for the mouse device 1 to correspondingly not only reduce the size and cost, but also suppress an increase in current consumption. It is, of course, needless to say that since the light sensor uses a type of generating electric power by light and detects the current generated in the light sensor as the photocurrent, the light sensor consumes no power, and a reduction in power consumption is enabled correspondingly.

A configuration of connecting each button switch of the mouse device 1 in parallel with the switch 113 and charging the capacitor 114 each time any button switch is operated may be adopted. Further, it is needless to say that when the operation signal outputted from the mouse circuit 108 is of a pulse signal, the signal is supplied to the capacitor 114 through the diode, and thereby the capacitor 114 may directly be charged with the signal.

As described above, the electronic device (e.g. the mouse device 1) having the light detection circuit 10 according to the present embodiment enables not only control such as starting the operation thereof by simply operating the electronic device even in the dark state in which the light detection circuit 10 is not capable of outputting the detection signal, but also control such as automatically stopping the operation thereof where the electronic device starts operation in the dark state and is not operated for a while. Further, it is possible to minimize an increase in size and cost and an increase in current consumption due to the addition of such a function.

What is claimed is:

1. An electronic device comprising:
a light detection circuit having a first light sensor and a second light sensor each generating a photocurrent by photoelectric conversion, a resistive element which allows a difference between the photocurrents generated by the first light sensor and the second light sensor to flow, and a voltage detection circuit which detects a voltage generated by the flow of the differential photocurrent through the resistive element, said electronic device being controlled in operation by an output signal of the light detection circuit;
a storing unit charged each time the electronic device is operated; and
a rectifying element provided between the storing unit and the resistive element,
wherein a current with which the storing unit is charged is made to flow to the resistive element through the rectifying element.

2. The electronic device according to claim 1, wherein each of the first light sensor and the second light sensor is a PN junction structure generating power with light, and outputs a photocurrent generated by the power generation.

3. The electronic device according to claim 1, which is a mouse device.

* * * * *